US008468694B2

(12) United States Patent
Moss et al.

(10) Patent No.: US 8,468,694 B2
(45) Date of Patent: Jun. 25, 2013

(54) REMANUFACTURED CYLINDER LINER FLANGE REPLACEMENT

(75) Inventors: Jarrod D. Moss, Washington, IL (US); Curtis J. Graham, Peoria, IL (US); Patrick W. Savage, Jr., Washington, IL (US); Trent A. Simpson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 913 days.

(21) Appl. No.: 12/509,728

(22) Filed: Jul. 27, 2009

(65) Prior Publication Data

US 2011/0016711 A1 Jan. 27, 2011

(51) Int. Cl.
*B23P 11/00* (2006.01)

(52) U.S. Cl.
USPC ............... 29/888.061; 29/888.06; 29/888.011

(58) Field of Classification Search
USPC ......... 29/888.061, 888.06, 888.041, 888.011, 29/402.08; 92/171.1; 123/41.84, 271
See application file for complete search history.

(56) References Cited

U.S. PATENT DOCUMENTS

| | | | | |
|---|---|---|---|---|
| 2,687,709 | A * | 8/1954 | Parrish | 123/41.79 |
| 2,912,562 | A * | 11/1959 | Donovan | 219/76.11 |
| 5,320,158 | A * | 6/1994 | Helgesen | 164/76.1 |
| 5,582,144 | A | 12/1996 | Mizutani | |
| 5,873,163 | A * | 2/1999 | Diefenthaler et al. | 29/888.06 |
| 6,439,173 | B1 * | 8/2002 | Chung | 123/41.84 |
| 6,668,702 | B2 | 12/2003 | Sud et al. | |
| 6,732,699 | B2 | 5/2004 | Wakade et al. | |
| 2007/0000129 | A1 * | 1/2007 | Hahn et al. | 29/888.011 |
| 2008/0314353 | A1 | 12/2008 | Highum | |

OTHER PUBLICATIONS

Workshop Manual:Engine; Volvo, Aug. 1996, http://kb-kbh.dk/shipslib/motorer/volvo/volvo_penta_tamd61a-72j-a_wm_engine.pdf.*

* cited by examiner

*Primary Examiner* — David Bryant
*Assistant Examiner* — Ryan J Walters
(74) *Attorney, Agent, or Firm* — Liell & McNeil; Janda M. Carter

(57) ABSTRACT

The present disclosure, in one form, provides a process for remanufacturing a flanged cylinder liner, comprising the steps of machining a top portion of the cylinder liner to remove the cylinder liner flange, thereby creating a flange seat portion, preparing the top portion of the cylinder liner to receive a replacement cylindrical flanged sleeve collar, aligning the center axis of the cylinder liner with the center axis of the cylindrical flanged sleeve collar, placing the sleeve collar into contact with the cylinder liner such that the cylindrical flanged sleeve collar abuts with the flange seat portion and affixing the cylindrical flanged sleeve collar onto the liner.

10 Claims, 3 Drawing Sheets

REMANUFACTURED CYLINDER LINER FLANGE REPLACEMENT

TECHNICAL FIELD

The field of this innovation is cylinder liners generally, and more specifically remanufacturing process for extending the working life of cylinder liners in which a damaged or worn flange area is replaced.

BACKGROUND

An internal combustion engine, such as a multi-cylinder diesel or gasoline engine, typically includes a cylinder block defining a plurality of cylinder bores, which reciprocally carry respective pistons therein. Each cylinder bore may include a cylinder liner in which the piston actually reciprocates. Cylinder liners allow a cylinder block with a particular cylinder bore configuration size to be used with multiple different diameter pistons by simply changing the cylinder liners for a particularly configured engine.

In the assembled engines, the liners may be held in place by a specific configuration of the liner and flange design. Generally constructed, liners have been supported at their upper ends in the cylinder block.

By using liners, they may be machined separately which permits accurate control of cylinder wall thickness and assures uniform cylinder cooling. Many diesel engines are designed and built with replaceable cylinders, and replacement cylinder and piston sets are manufactured and made available for overhauling diesel engines. The cylinder liners may be removed and replaced if worn through use over time. These liners are typically held in place by a flange between the block and cylinder head.

In some applications, the liner installation and assembly of the engine, and the operating conditions in the engine (especially the high temperatures involved with starting up and cooling off) may create undesired stress levels in the liners. One of the greatest risks to cylinder liners is a flange crack resulting in liner failures. The highest stresses generally occur at the location of an arcuate or radiused fillet at the juncture of the outer surface of the cylinder with the lower surface of the radial flange. The thickness of the cylinder wall may be further reduced by an undercut provided at and/or adjacent to the fillet to provide for machining of the outer surface of the cylinder wall with room for tool run-out adjacent to the fillet, again a possible stress/fracture point.

Over the years, engineers have devised a long list of ways to reuse cylinder liners. In fact, the reuse of cylinder liners dates far back, in conjunction with other engine components on and in machines and vehicles. From those early dates forward, numerous manufacturers of engine blocks have included some remanufacturing strategies to allow the reuse of components involved with the block. These strategies included recoating the liners, resurfacing the liners—outside and inside, and initiating new gaskets and rings for use with the replacement liner to ultimately provide strength of a potential area of structural weakness. However, heretofore, none have addressed the simultaneous issues of liner wear and structural damage due to flange stresses, which can lead to expensive consequential damage. One aspect of these types of restoration and remanufacturing operations is that each is very expensive and can often only be justified economically in commercial operations or in situations in which the cost of replacement of the entire engine is prohibitive.

The present disclosure is directed to overcoming one or more of the problems set forth above.

SUMMARY

The present disclosure, in one form, provides a process for remanufacturing a flanged cylinder liner, comprising the steps of machining a top portion of the cylinder liner to remove the cylinder liner flange, thereby creating a flange seat portion, preparing the top portion of the cylinder liner to receive a replacement cylindrical flanged sleeve collar, aligning the center axis of the cylinder liner with the center axis of the cylindrical flanged sleeve collar, placing the sleeve collar into contact with the cylinder liner such that the cylindrical flanged sleeve collar abuts with the flange seat portion and affixing the cylindrical flanged sleeve collar onto the liner.

In another aspect, a method of making and using a liner having a circumferentially positioned flange, comprising: installing a newly manufactured liner in an engine block, operating the engine, whereby causing wear on the cylinder liner, disassembling the engine, removing the liner from the engine block, cleaning the cylinder liner, inspecting the cylinder liner, removing the worn flange from the cylinder liner; replacing the worn flange with a new brazed cylindrical shoulder sleeve, and reinserting the cylinder liner into the engine block for further use.

Other advantages and novel features of the present disclosure will become apparent from the following detailed description of the disclosure when considered in conjunction with the accompanying drawings. The drawings constitute a part of this specification.

DETAILED DESCRIPTION

Figure 1:
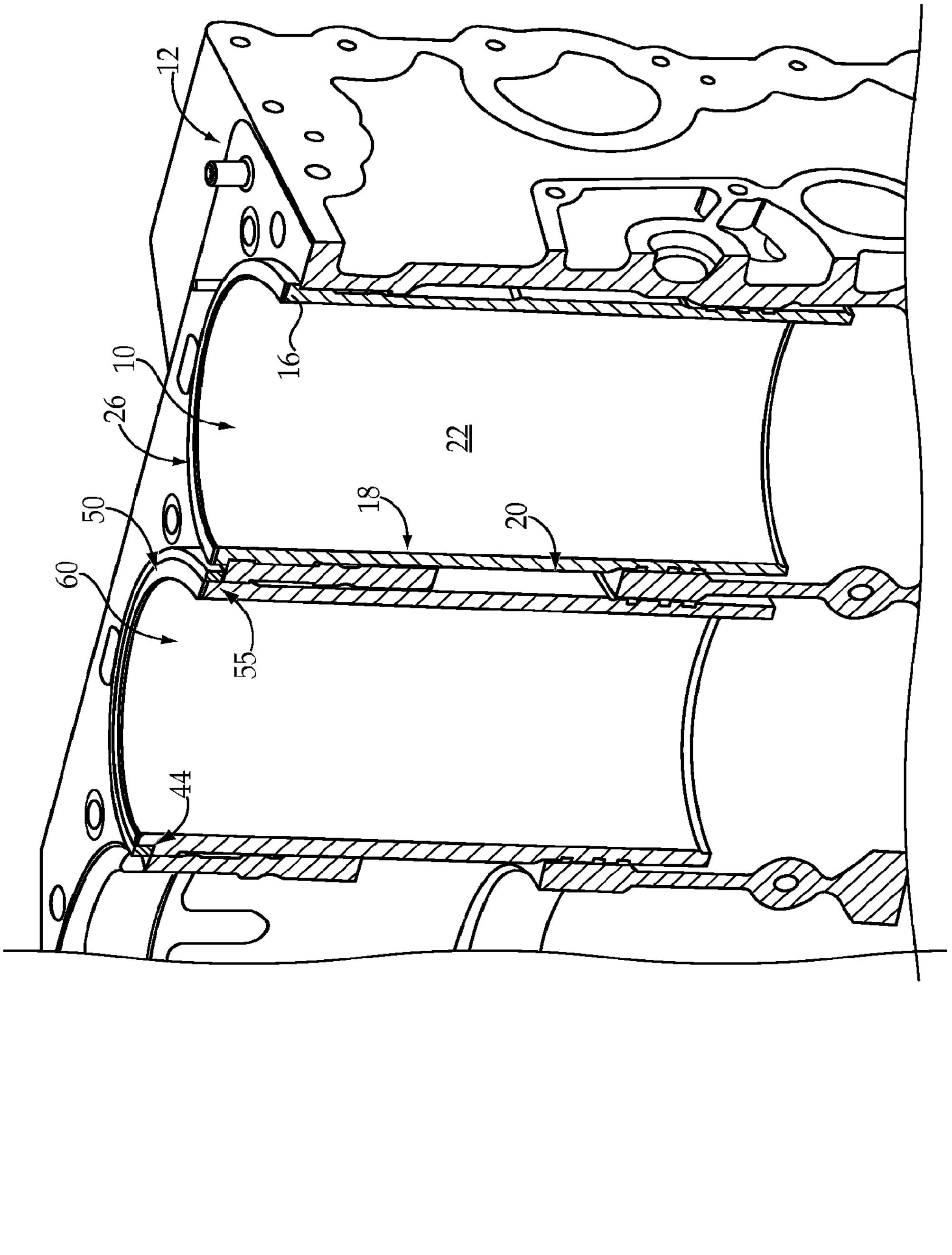
FIG. 1 is a perspective view of a cylinder liner and replacement cylindrical shoulder sleeve according to one aspect of the present disclosure.

Referring now to the drawings wherein the showings are for the purpose of illustrating embodiments of the disclosure only, and not for the purpose of limiting the same, FIG. 1 illustrates an original cylinder liner 10 in accordance with this disclosure, and a remanufactured cylinder liner 60 embodying the novel aspects of the present disclosure in association with an engine block 12. While two cylinder liners 10, 60 are shown and discussed, it should be understood that an engine block 12 housing cylinder liners could have a plurality of liners in various geometric patterns within the block 12. The cylinder liners 10, 60 may be made of various metals and heated or heat-treated or coated using various means. The cylinder liners 10, 60 may be machined from one solid material casting.

Generally, a cylinder liner 10 has a cast iron body including a radially extending upper flange 16 and a generally cylindrical wall 18. The wall 18 extends axially downward from an inner portion of the flange at a juncture between the upper flange 16 and a cylindrical outer surface 20 of the wall 18. An interior surface of the liner 10 defines a bore 22, which extends through the upper flange 16 and the cylindrical wall

18 to form, when finished, a suitable sliding surface for engine pistons within an engine block 12.

In assembly, the original cylinder liner 10 may be press fitted into a bore of an associated engine block 12, so that the bore supports the cylindrical wall 18 radially. The engine block 12 may have circular, plane recesses, or flange seats along an upper surface (not shown). On some engines, these seats fix the cylinder liner 10 in an axial direction in the block 12. The flange of the cylinder liner may fit exactly into the recess so that the liner rests its entire circumference on the flange seat to avoid force fractures at the flange 16. Contrastly, the flange 16 may rest upon the engine block 12 around the upper end of the bore 22. The inner surface or bore 22 of the liner extends axially to the upper end where a small chamfer may connect the bore 22 with an upper surface 26 of the flange 16. A cylindrical outer surface 20 connects the upper surface downward with a lower surface 30 of the flange.

Figure 2:
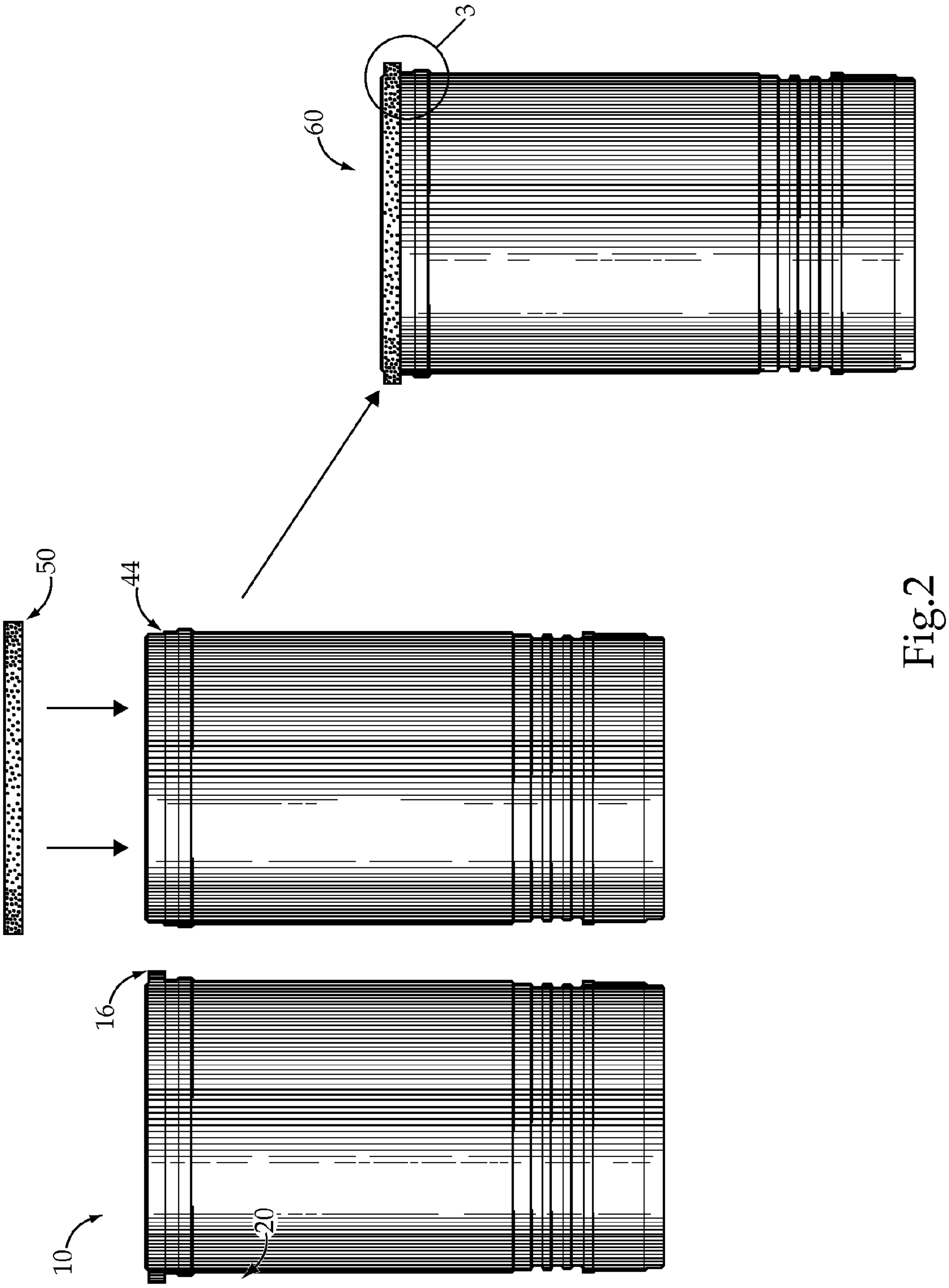
FIG. 2 is a diagrammatic view of an embodiment of the present disclosure.

As illuminated in FIG. 2, the annular flange 16 is located curcumferentially around the cylinder liner. The annular flange 16 extends in an axial direction from the bottom of the flange. The original cylinder liner 10 and the annular flange are typically manufactured as one unit, from one material. Manufacturing methods may include but are not limited to casting and machining. An arcuate or radiused fillet may be included at the juncture of the outer surface of the cylinder with the lower surface of the radial flange 16. While the focus heretofore has been on a cast iron liner, the liner may be made of any protective strength material known to one of skill in the art.

The original cylinder liner 10 may become worn through use over time, or need to be removed for maintenance reasons. At this point, the liner 10 may be removed from the engine block 12. For example only, a shaft screw (not shown) may be used to pull down on a cam lever type tool to loosen the liner 10. If the liner 10 sticks in the block, the lever tool may be turned in a clockwise direction until the liner 10 is loose. The liner puller may be removed and the liner 10 lifted from the engine block 12. Then the o-rings and seals (if used) may be removed and discarded from the liner 10.

Rather than discard the entire original cylinder liner 10, after inspection and determination that the flange area has undergone undesired stress, a cylindrical flanged sleeve collar or new flange 50 may be attached. Following removal of the original liner 10, it is important to avoid uneven surfaces and warpage at the flange seat 44 before attaching the cylindrical flanged sleeve collar 50. This can be achieved by properly preparing the flange seat surface 44 to receive the collar 50. Cleaning methods may include but are not limited to blasting compressed air in the gap area to remove dirt, chips, residue, etc.

Preferably, the flanged sleeve collar 50 is formed from a single piece of metal or other suitable material that is formed into the cylindrical configuration, as shown in FIG. 2. However, it should be appreciated that the flanged sleeve collar 50 utilized in the present disclosure can be formed from any material that serves to form the sleeve and undergo the required heating process for joining the sleeve to the liner with the damaged flange portion removed 40. Here, the cylindrical flanged sleeve collar 50 would optionally be made from steel.

Turning again to the illustrated cylinder assembly in FIG. 2, the liner 10 is shown after the worn flange portion 16 is removed, creating the shoulder flange seat portion 44 of the cylinder liner. The flange seat portion 44 may form an L-shape. Installation and alignment of the cylindrical sleeve collar or replacement flange 50 may be aided through the use of alignment tools or guides as given in reference to the center axis within the cylinder liner 40. By way of example, when the replacement flanged collar 50 is attached to the cylinder liner with the damaged flange portion 16 removed, the shoulder portion or flange seat 44 contacts the lower edge of the collar 50 with alignment of the inner diameter of the liner 40 and the collar 50.

When joining the cylindrical flanged sleeve collar 50 with the original cylinder liner, after removing the original damaged flange portion from the top portion, a brazing process may be used. As the brazing process will likely involve iron, steel or other ferrous metals, a high silver brazing alloy and appropriate flux is contemplated but not required. Brazing filler metals 70 are invariably alloys, made of two or more "pure" metals.) This composition determines whether the filler metal is compatible with the metals being joined—capable of wetting them and flowing completely through the joint area without forming detrimental metallurgical compounds.

Joint soundness may be assured by using more rather than less filler metal. To calculate the precise amount, calculate the volume of the joint (at the brazing temperature), adding 10-25% for fillet and shrinkage, and then supply the equivalent volume of filler material. One illustrative example of this kind of product is Handy & Harman Brazing Filler Metal Easy-Flo 45, with a nominal composition, %: 45Ag 15Cu 16 Zn 24Cd, among others. Further, the brazement may be annealed to homogenize the grain structure and composition with that of the parent material as is known in the art.

Figure 3:
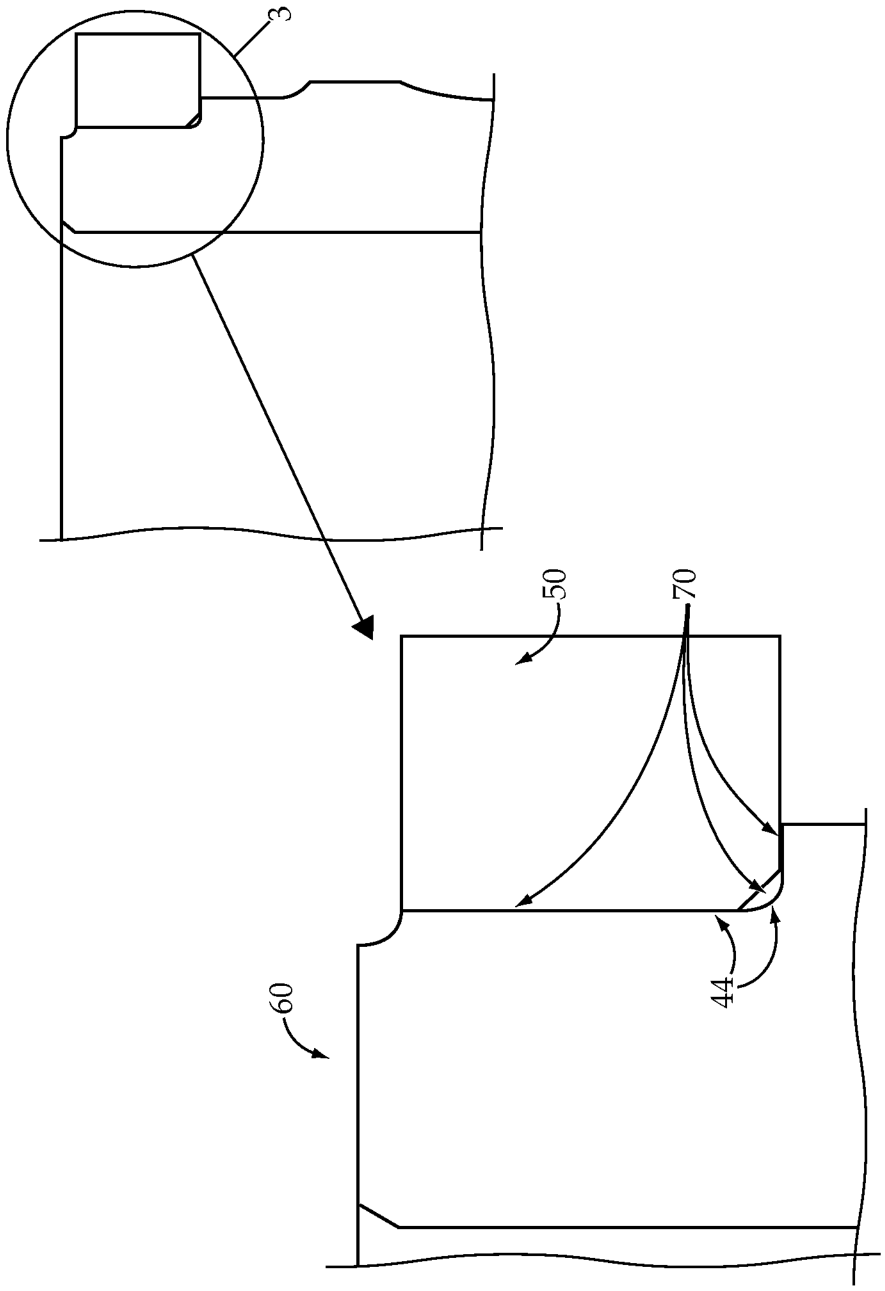
FIG. 3 is a cross sectional view of a top portion of a remanufactured cylinder liner of an aspect of the present disclosure.

Referring to FIG. 3 of the drawings, there is illustrated an enlarged cross sectional view of the upper end portion of the remanufactured cylinder liner 60 shown in circle 3 of FIG. 2. A cross-sectional cut through the composite remanufactured cylinder liner assembly 60 reveals that the cylindrical flanged sleeve collar 50 may incorporate a chamfer 55 or chamfered edge along a bottom edge of the collar 50. The chamfered section 55 of the collar 50 may abut the cylinder liner outer diameter along the flange seat 44. The braze filler material 70 may pool in the area between the chamfered portion 55 and the flange seat 44.

It will be appreciated by those skilled in the art that the overall dimensions and thickness of the cylindrical flanged sleeve collar 50 and cylinder liner 40, are a function of the size, shape and length of the engine block and the particular application. In addition, if desired, the remanufactured composite liners 60 may be used in harmony with existing blocks with original liners in place, thus enabling economical adaptation.

INDUSTRIAL APPLICABILITY

The industrial applicability of a remanufactured cylinder liner 60 described herein will be readily appreciated from the foregoing discussion. The present disclosure finds potential application to any engine encompassing an original flanged cylinder liner 10 in which the desire is to remanufacture and reuse the liner after there had been damage to the flange joint due to use or other damaging conditions. This strategy allows the remanufactured cylinder liner 60 of the present disclosure that has life left, but for the damaged or stressed flange joint, to be remanufactured with a new flange or cylindrical flanged sleeve collar 50 to present a combined layered line of defense against the costly discarding of liners.

Examples of the present disclosure are applicable to any cylinder assembly, especially one employing a standard liner machined from one solid casting remanufactured into a composite liner with a new, affixed flanged sleeve collar 50 in direct contact with a flange seat 44, further where the assembly is attached via a brazing process. Application of the foregoing apparatus may keep provide longer wearing lines and better quality parts, free from premature discarding.

It will be appreciated that the foregoing description provides examples of the disclosed device. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely, unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A process for remanufacturing a flanged cylinder liner, comprising the steps of:

machining a top portion of a cylinder liner removed from an engine block, to remove a cylinder liner flange, thereby creating a flange seat portion;

preparing the top portion of the cylinder liner to receive a replacement cylindrical flanged sleeve collar;

aligning the center axis of the cylinder liner with the center axis of the cylindrical flanged sleeve collar;

placing the sleeve collar into contact with the cylinder liner such that the cylindrical flanged sleeve collar abuts with the flange seat portion; and affixing the cylindrical flanged sleeve collar onto the cylinder liner.

2. The process for remanufacturing a cylinder liner, as set forth in claim 1 wherein the cylinder liner is procured from an engine block after being in service.

3. The process for remanufacturing a cylinder liner, as set forth in claim 1, wherein the cylinder liner is cylindrical.

4. The process for remanufacturing a cylinder liner, as set forth in claim 1 wherein the cylinder liner is machined from one solid material casting.

5. The process for remanufacturing a cylinder liner, as set forth in claim 1, wherein the flange is worn.

6. The process for remanufacturing a cylinder liner, as set forth in claim 1, wherein the cylindrical flanged sleeve collar is affixed by a brazing process.

7. The process for remanufacturing a cylinder liner, as set forth in claim 1, wherein said cylindrical flanged sleeve collar includes a chamfered section.

8. The process for remanufacturing a cylinder liner, as set forth in claim 7, wherein the chamfered section of the collar abuts the cylinder liner outer diameter along the flange seat portion.

9. The process for remanufacturing a cylinder liner, as set forth in claim 7, wherein an area is formed between the chamfered section of the collar and the flange seat portion via the placement of the collar into contact with the cylinder liner, for pooling of a braze filler material.

10. A process for making and using a cylinder liner having a circumferentially positioned flange, comprising:

installing a newly manufactured cylinder liner in an engine block, operating the engine, thereby causing wear on a flange the cylinder liner, disassembling the engine, removing the cylinder liner from the engine block, cleaning the cylinder liner, inspecting the cylinder liner, removing the worn flange from the cylinder liner;

replacing the worn flange with a new brazed flange abutting a flange seat portion formed by the removal of the worn flange, and reinserting the cylinder liner with the new brazed flange attached into the engine block for further use.

* * * * *